United States Patent [19]

Brightman

[11] 3,816,654

[45] June 11, 1974

[54] SOLID STATE CAMERA TUBE EMBODYING A FIXED IRIS

[75] Inventor: Barrie Brightman, Webster, N.Y.

[73] Assignee: Stromberg-Carlson Corporation, Rochester, N.Y.

[22] Filed: May 2, 1972

[21] Appl. No.: 249,594

[52] U.S. Cl. ................ 178/7.2, 178/7.86, 178/7.87, 178/DIG. 8, 178/DIG. 29, 179/2 TV, 250/83.3 HP

[51] Int. Cl. .......................... H04n 5/26, H04n 5/30

[58] Field of Search ......... 178/7.2, DIG. 8, DIG. 27, 178/6.8, 7.85, 7.86, 7.87, DIG. 38, DIG. 29; 250/71.5 S, 83.3 H, 83.3 HP; 313/122, 101, 65; 356/51; 350/1, 311; 179/2 TV

[56] References Cited

UNITED STATES PATENTS

| | | | |
|---|---|---|---|
| 3,046,441 | 7/1962 | DeVore | 313/65 R |
| 3,252,030 | 5/1966 | Cawein | 313/101 |
| 3,514,174 | 5/1970 | Gans et al. | 350/1 |
| 3,571,504 | 3/1971 | Kiuchi et al. | 178/DIG. 8 |
| 3,674,925 | 7/1972 | Heckman | 178/DIG. 8 |
| 3,748,383 | 7/1973 | Grossman | 178/7.2 |

*Primary Examiner*—Robert L. Richardson
*Attorney, Agent, or Firm*—Charles C. Krawczyk; William F. Porter, Jr.

[57] ABSTRACT

A solid state camera tube is provided with an optical filter which acts as a fixed iris. A solid state photoconducting target activated by the infrared light is provided in the camera tube. A light source comprising an array of infrared light emitting diodes is employed with the camera tube to illuminate the image. The camera tube and the light source is combined to provide apparatus for surveillance, or in combination with a display, for suitable use in an audio-video telephone system.

5 Claims, 7 Drawing Figures

SOLID STATE CAMERA TUBE EMBODYING A FIXED IRIS

BACKGROUND OF THE INVENTION

This invention relates to a fixed iris arrangement suitable for use with a television camera.

The camera and monitor (display panel) for a video type telephone system must be able to function properly in an environment wherein the light intensity may be expected to vary between wide limits. Such wide limits of environment are represented by a subject illuminated by a very subdued night light of approximately 2 foot lamberts, to a subject illuminated via a window by daylight on a very bright day with the camera pointed directly at the window wherein the light intensity is of the order of 600 foot lamberts. Suitable typical means permitting the use of a video type telephone system under these wide light conditions employs a camera having a very wide aperture lens such, for example, as one having a *f* 1.4 stop and a variable iris to control the diameter of the aperture. An electromechanical system is connected to the variable iris to vary the opening therein in accordance to the amount of reflected light from the image focused upon by the camera. The electromechanical system typically comprises a motor mechanically coupled to the variable iris. Under control of movement initiated by the motor, the opening in the iris is varied in accordance to the light falling upon it to provide a variable aperture through which the reflected light is permitted to pass and impinge upon the lens of the camera.

One type of variable iris functions in the following manner. The reflected light from the image develops an output voltage across a given resistor via a light sensitive receptor device. The output voltage developed is proportional to the amount of light reflected from the image focused upon by the camera. Therefore, the greater the amount of reflected light from the image, the greater the output voltage. The developed output voltage is applied to an amplifier which, in turn, applies a signal to a processing circuit. A signal output of the processing circuit is applied to the motor which causes the variable iris to increase or decrease the iris opening (aperture). As the reflected light level from the image decreases, the developed output voltage is reduced accordingly, thereby decreasing the input to the amplifier. The amplifier in turn, applies a reduced signal on the processing signal causing the motor to operate in a manner to increase the aperture opening to enable sufficient light to enter and impinge on the lens of the camera to properly capture the definitive attributes of the image. In a similar manner, an increase in the level of reflected light from the image results in the motor causing the iris to reduce the size of the aperture opening. However, this method of reflected light compensation requires a considerable amount of complex circuitry and equipment to provide adequate camera definition of the image for proper viewing on a monitor connected thereto. It would be advantageous to utilize a camera wherein the complex circuitry, equipment and variable iris could be eliminated.

Therefore, a fixed iris would be most desirable for a camera as it would eliminate the need for the complex circuitry and equipment described heretofore. However, the use of a fixed iris necessitates the need for providing reflected light from an image being viewed by the camera which will enable the audio-video telephone system embodying the camera to provide a continuous acceptable picture of the image on a display panel associated therewith.

An object of this invention is to provide a new and improved camera having a fixed iris and suitable for use in an audio-video type telephone system.

It is another object of this invention to provide a new and improved camera for use in an audio-video type telephone system wherein the camera has a fixed iris which permits the passage of infrared light and substantially blocking out the passage of the remaining wavelengths of light.

It is a further object of this invention to provide a means for illuminating an image viewed by the camera in an audio-video type telephone system with infrared light produced by an array of solid state elements and wherein the camera has a fixed iris which only permits the passage of infrared light of a predetermined range of wavelengths.

Other objects will, in part, be obvious and will, in part, appear hereinafter.

BRIEF DESCRIPTION OF THE INVENTION

In accordance with the teachings of this invention, there is provided a solid state camera tube comprising a housing, a solid state photoconducting target having an active surface for exposure to, and activation by, a selective portion of the light spectrum disposed in the housing and a fixed iris disposed in one end of the housing. The fixed iris has the capability of permitting substantially only a selected portion of the light spectrum to be impinged upon the active surface of the target. Circuit means are disposed in the housing for periodically scanning the target and for transmitting the information of the target via electrical connecting means disposed in the vicinity of another end of the housing to electrical circuitry when connected thereto. Preferably, the fixed iris is an optical filter which permits the passage of only infrared light of an approximate wavelength of 0.8 to 0.9 micron. A first alternate embodiment utilizes the solid state camera tube in combination with a light source comprising an array of infrared light emitting diodes for surveillance purposes. A second alternate embodiment utilizes the solid state camera tube and the light source in combination with a display panel in an audio-video telephone system.

DESCRIPTION OF THE INVENTION

It is well known in the art that the solid state silicon diode type target tube, of the type sometimes associated with audio-video telephone systems, is activated in part by infrared light, as well as by visible light. Indeed the collection efficiency of a solid state target is greater for infrared light than for visible light ("A Solid-State Election Tube For The Picture Phone Set" by E. I. Gordon, *Bell Laboratories Record*, Volume 45, No. 6, June 1967, Pages 175–179.) The reflected infrared portion of the light spectrum is deemed undesirable however. A light filter is therefore embodied in the camera tube to block the passage of the reflected infrared portion of the light spectrum. Only that portion of the light spectrum which is visible is passed to impinge upon the active surface of the target.

It was discovered that when the reflected light from an image is of a specific portion of the light spectrum that one can utilize a fixed iris in a solid state camera tube for an audio-video telephone system. The fixed iris may be a glass filter or an optically coated camera lens which governs the passage through the fixed iris and/or the optically coated lens of a particular portion of the light spectrum. As a substitute for the visible light normally employed to illuminate the image, one can employ a light source of that particular portion of the light spectrum which will be passed by the fixed iris and which is of a sufficient intensity to illuminate the image being viewed by the camera. The light source which one can employ comprises a cluster of light emitting diodes suitable for the generation of that particular portion of the light spectrum which will be passed by the fixed iris. Arrays of light-emitting diodes are available commercially to produce a source of infrared light ("Light-Emitting Diodes" by David L. Hasuman, *Electronics World*, Pages 36, 37 and 67; "Planar Beam-Lead Gallium Arsenide Electroluminescent Arrays" by W. T. Lynch, Volume ED–14, No. 10, October 1967, and "The Optoelectronics Revolution" by Luthar Stern and Irwin Carroll, *Electronics World*, July 1971, Pages 46–48.)

Figure 1:
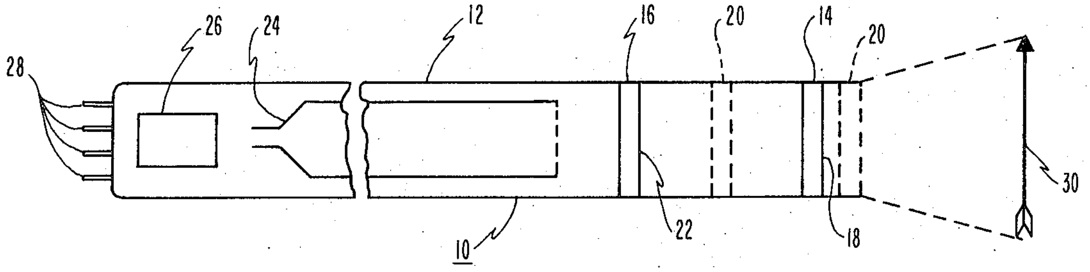
FIG. 1 is an elevation view, partly in cross section, of a solid state camera tube embodying a fixed iris of the teachings of this invention.

Referring now to FIG. 1, there is shown a solid state camera tube 10. The camera tube 10 comprises a housing 12 having disposed therein an optical filter 14 and a solid state photoconducting target 16. The optical filter 14 may be either an optical glass suitable for the passage of substantially only a selected portion of the light spectrum or a lens having at least one surface 18 optically coated to enable the passage of substantially only a selected portion of the light spectrum therethrough. A collimator lens 20 may be disposed between the optical filter 14 and the target 16 to enable the light passed by the optical filter 14 to impinge uniformly upon an active surface 22 of the target 16. Alternately, the collimator lens 20 may be disposed in front of the filter 14 as also shown in FIG. 1. Circuit means 24 and 26 are provided in the vicinity of another end of the housing 12 to periodically scan the target 16 and transmit the information of the target 16 via a plurality of connector pins 28 located at the end of the housing opposite the end having the filter disposed therein to a conventional electrical system (not shown) when connected thereto to provide electrical signals for displaying an image 30 being viewed by the camera tube 10 on a television type picture tube.

Figure 2:
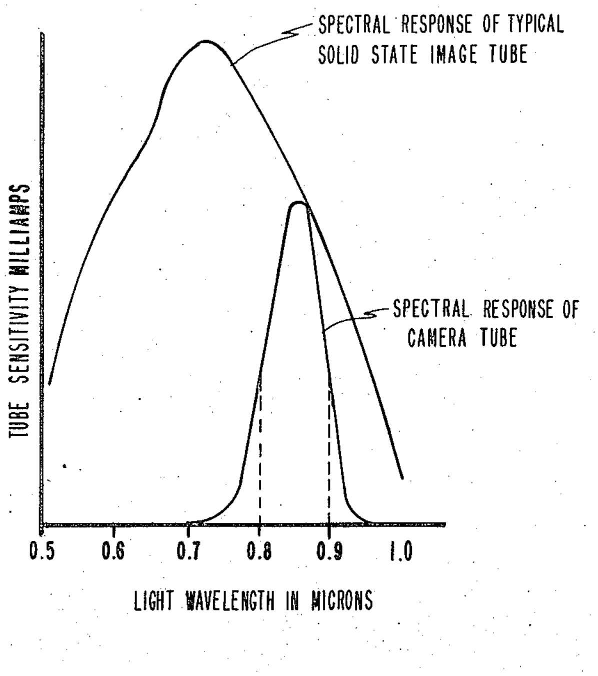
FIG. 2 is a graph showing the spectral responses of a typical solid state image tube and the camera tube of this invention.

The filter 14 acts as a fixed iris for the camera tube 10. This is in contrast to the prior art camera tubes which have a variable iris to vary the size of the aperture through which light reflected from the image 30 is caused to pass. The opening of the aperture of the camera tube 10 is therefore the area of the filter 14 or fixed iris upon which the reflected light of the image 30 impinges. The filter 14 is preferably an optical glass acting as a narrow band pass filter which preferably allows only infrared light having a wavelength of from approximately 0.8 micron to approximately 0.9 micron, to pass therethrough. The spectral response of the camera tube 10 of this invention is shown in FIG. 2. The spectral response of a typical solid state image tube is also shown to illustrate the breadth of the band of light frequencies which the filter 14 must attenuate properly for operation of the tube 10. All other light is absorbed or reflected. The very wide optical bandwidth of visible and invisible light frequencies provided by natural or artificial light means is attenuated and only a very minute portion, that being a part of the infrared portion, is admitted to impinge upon the active surface 22 of the target 16. The filter 14 may also have a coating applied to a surface 18 to aid in the limiting of the passage of only the selected wavelengths of light. The filter 14 has a typical filter bandpass characteristic as illustrated in FIG. 2. The magnitude of light intensity entering the camera tube 10 between the high visible and low visible values is, therefore, very small since it is not in the infrared region.

The selected wavelengths of radiation of approximately 0.8 to 0.9 micron covers a portion of the infrared segment of the light spectrum. Limiting the spectral response of the camera tube 10 to no greater than approximately 0.8 micron eliminates that portion of the infrared spectral response which causes the relative gray scale balance of the image 30 to become distorted when viewed in infrared light. In addition, it is known to those skilled in the art that the collection efficiency of a solid state photoconductive target for an audio-video telephone system is greater for infrared light than for visible light. The difference in efficiencies occurs because visible light of from about 0.4 to 0.7 micron is absorbed within a distance of no greater than approximately 0.0001 inch from the surface of the target 16 upon which the light impinges. Light of wavelengths from approximately 0.7 to 1.1 micron is absorbed deeper beneath the light impinged surfaces. For light of wavelengths of about 1.1 micron and above, the target is essentially transparent to them. One can therefore tailor make the target 16 to be more highly efficient by locating each of the p-n junctions of the array of diodes comprising the target 16 at a predetermined depth beneath the impinging surface which will provide a maximum efficiency of the collection of the photons generated in the diodes of the target 16.

Figure 3:
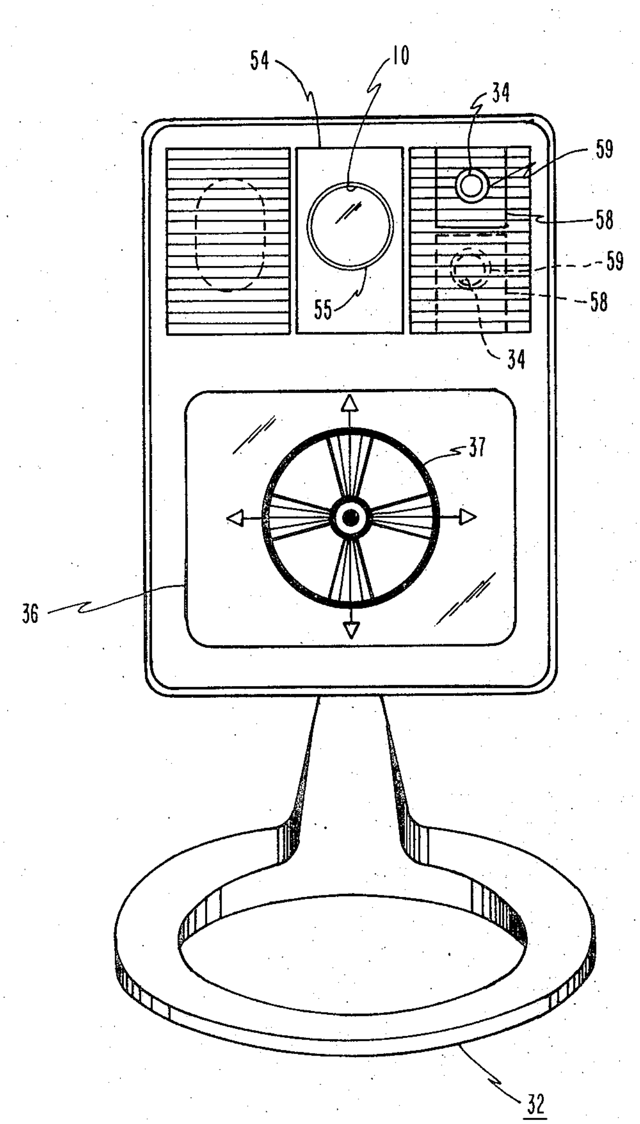
FIG. 3 is a front view of apparatus embodying the camera tube of FIG. 1 and a light source made in accordance with the teachings of this invention.
Figure 4:
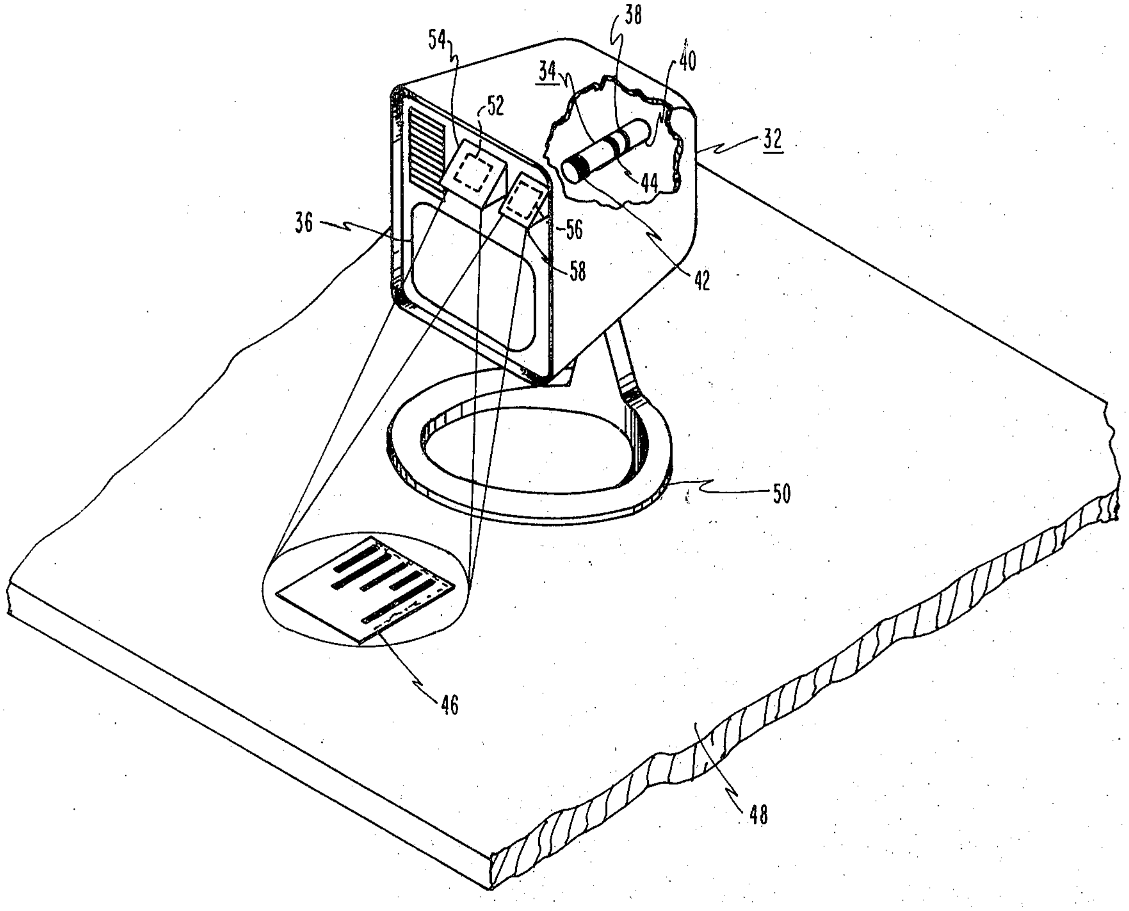
FIG. 4 is an isometric view, partly in cross section, of the apparatus of FIG. 3 illustrating one particular use of the apparatus.
Figure 5:
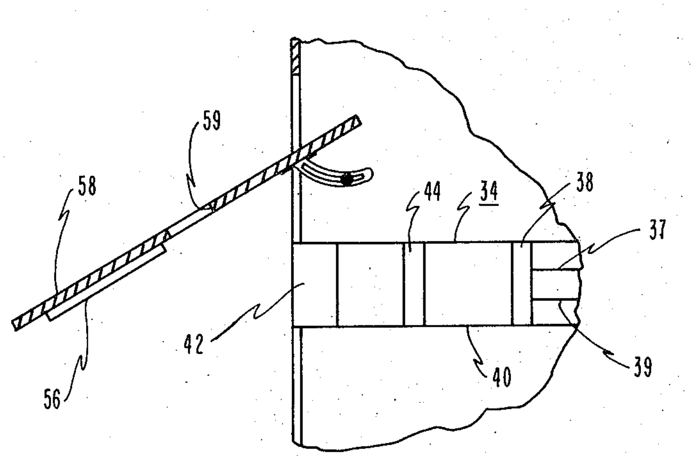
FIG. 5 is a side elevation view, partly in cross section, of a portion of the apparatus of FIG. 3 including the light source and optics therefor.

With reference to FIGS. 3, 4, and 5, there is shown apparatus 32 (often called a picture telephone) suitable for use in an audio-video telephone system embodying the camera tube 10. The picture telephone 32 comprises one or more light sources 34 and a display panel 36 for an image 37 viewed by a camera tube 10 of another connected telephone subscriber. Each of the light sources 34 comprises an array 38 of light emitting diodes of a material suitable for emitting light in the region of infrared wavelengths such, for example, as gallium arsenide, disposed within a housing 40. Leads 37 and 39 provide an electrical connecting means for activating the array 38. A wide angle lens 42 is provided in one end of the housing 40 of the light source to enable the emitted light to cover a field of approximately 53°. The array 38 of light emitting diodes is sufficient to illuminate the image 30 at a distance of up to approximately 20 feet. A colliminating lens 44 may be disposed in the housing 40 between the array 38 and the wide angle lens 40 to preferentially orient the emitted rays of the array in a more definitive parallel path arrangement. As an alternative, the lens 44 may also be disposed in front of the lens 40.

In order to display the image of an object 46 placed on the same surface 48 upon which the base 50 of the apparatus 32 is disposed, and within a short distance thereof (in the order of 3 to 6 inches, approximately), a mirror 52 is mounted on an adjustable visor 54 to enable the camera tube 10 to view the object 46, as is well known in the art. Likewise, a second mirror 56 is mounted on a second adjustable visor 58 for each of the light sources 34 to enable the light emitted by the array 38 to be directed toward, and to irradiate or illuminate, the object 46. In a normal operating position, apertures 55 and 59 are provided in the respective visors 54 and 58 to permit the unrestricted transmission of light therethrough. In each instance, the visor is adjustable either manually or by remote control.

Figure 6:
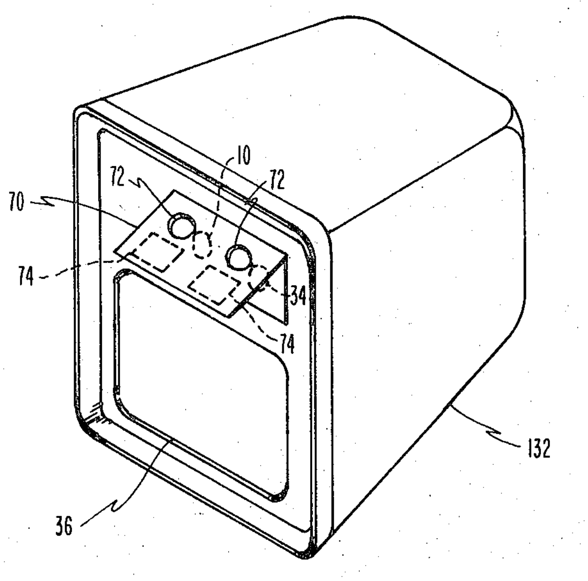
FIG. 6 is an isometric view of an alternate embodiment of the apparatus of FIG. 4.

Alternately, as shown in FIG. 6, apparatus 132 which is another embodiment of the apparatus 32, the camera tube 10 and the one or more light sources 34 of this invention are so arranged that only one adjustable visor means 70 is required for irradiating and viewing the object 46 disposed near the base of apparatus 132. Walls define a plurality of apertures 72. Each of said apertures 72 is associated with a particular light source 34 and camera tube 10 and extends entirely through the thickness of the visor means 70 to allow the transmission of light rays therethrough. When the visor means 70 is adjusted to view objects near the base of the apparatus 132 and blocks the transmission of light rays through the apertures 72, a plurality of mirrors 74, each of which is associated with a particular light source 34 and camera tube 10 and its associated aperture 72 is so situated on the adjustable visor 70 so as to redirect the rays downward from the light source 34 to the object and back upward to the camera tube 10.

Figure 7:
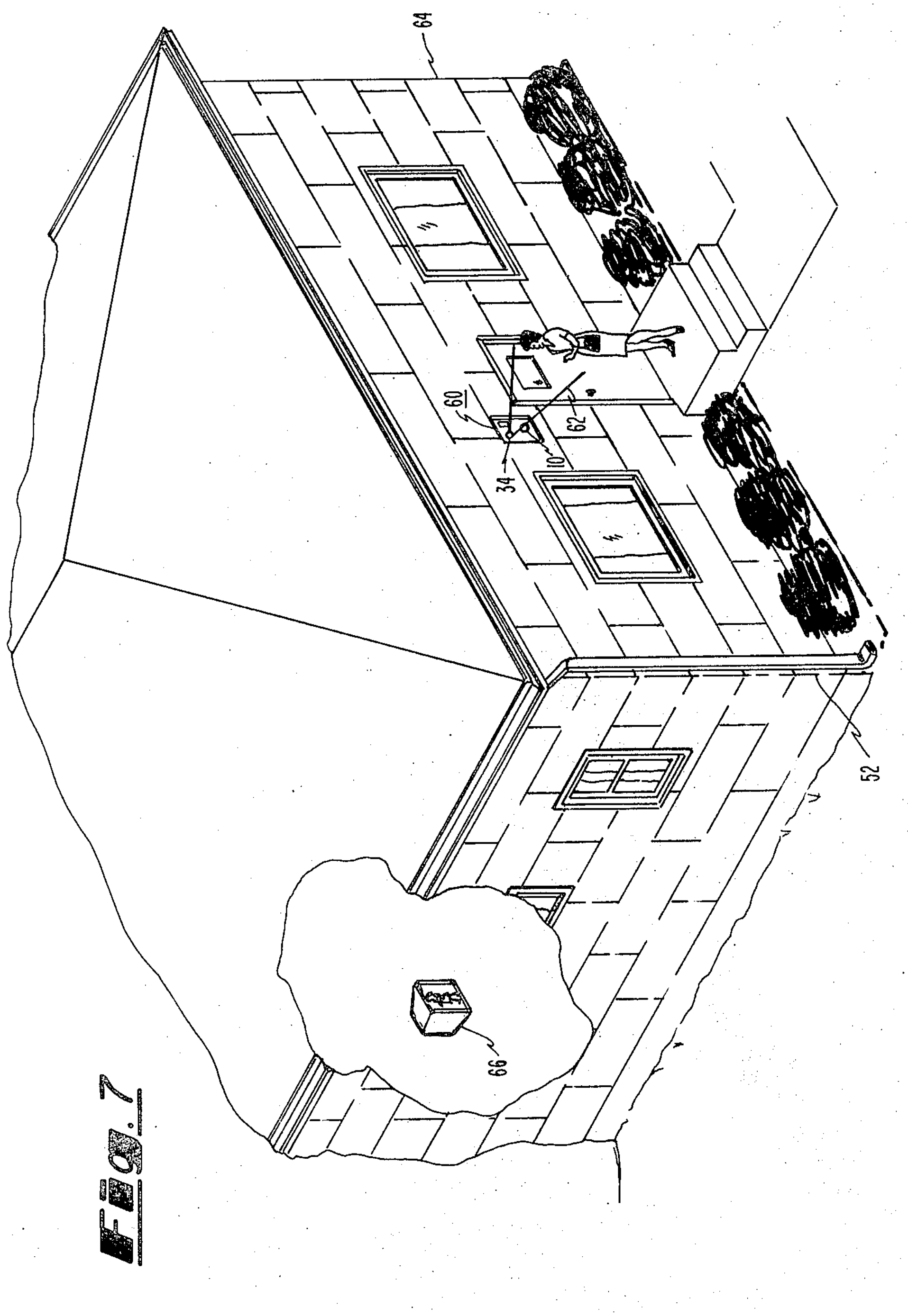
FIG. 7 is an isometric view illustrating the use of an alternate embodiment of the camera tube and light source of this invention.

The camera tube 10 and the light source 34 may be used together and separate from the display screen 36 in order to provide apparatus to perform surveillance for building entries or small enclosures. As shown in FIG. 7, apparatus 60 is shown mounted on the wall near an entry 62 to a building 64. The apparatus 60 comprises the camera tube 10 and the light source 34 of this invention to monitor the area in the vicinity of the entry 62 to the building 64. The reflected image captured by the camera 10 is viewed on a display screen 66 within the building 64. The apparatus 60 enables a person within the building 64 to identify a person or persons seeking entry to the building 64 without having to open the entry 62 to the building 64. The person or persons seeking entry are most usually unaware of being illuminated for the camera tube since the infrared light is not perceived by the person or persons unless they are provided with special equipment for detecting infrared light.

It is to be noted therefore that the camera tube of this invention operates in a manner completely opposite to those of the prior art camera tubes. Whereas only visible light was allowed to impinge on the active surface of the target and the infrared light portion of the light spectrum was blocked, the procedure is reversed and the camera tube 10 is activated only by the selected portion of the infrared portion of the light spectrum.

What is claimed is:

1. A camera system for use in a communication system comprising:

a television camera tube including a solid state photoconductive target disposed therein for receiving radiation from objects viewed by the camera tube, said target having an active surface for activation by a wide range of wavelengths of radiation applied thereto;

a filter functioning as a fixed iris which transmits only infrared light of the range of wavelengths of about 0.8 to 0.9 microns for activating the solid state photoconductive target;

radiation source means for producing infrared radiation;

optical means for transmitting infrared radiation from said source in a direction to irradiate objects viewed by said camera tube, and circuit means for periodically scanning said target and transmitting electrical signals corresponding to the objects viewed by said camera tube and irradiated by said infrared radiation.

2. Apparatus for viewing images illuminated by infrared light comprising:

radiation source means for producing infrared radiation;

optical means for transmitting infrared radiation from said radiation source in a direction to irradiate objects to be viewed by a television camera tube;

a solid state television camera tube comprising a housing, a solid state photoconductive target disposed in said housing and having an active surface for activation by a wide range of wavelength of light;

a filter disposed in an end portion of said housing and arranged to transmit only infrared radiation of the range of wavelengths of from 0.8 to 0.9 microns to the active surface of the target to activate the target, and circuit means for periodically scanning the target and transmitting electrical signals corresponding to the irradiated objects viewed by said camera.

3. The apparatus as defined in claim 2 including:

a second housing for enclosing therein said radiation source means, said optical means and said solid state camera tube;

an adjustable visor means affixed to said second housing and associated with said radiation source means and said solid state camera tube, said adjustable visor having walls defining a plurality of apertures extending entirely through the thickness of the visor to permit the transmission therethrough of rays of light associated with said light source and said camera tube, and a plurality of mirrors affixed to said adjustable visor whereby each of said mirrors is associated with a particular camera tube and a light source and is repositioned with respect to said second housing so that when the transmission of rays of light through the aperture associated with the camera tube or light source ceases, the rays of light are redirected by the mirror.

4. The apparatus as defined in claim 3 including:
a display screen disposed in said housing for displaying objects viewed by another remote television camera tube.

5. The apparatus as defined in claim 4 wherein:
said radiation source means comprises at least one array of infrared light emitting diodes.

* * * * *